(12) United States Patent
Qi et al.

(10) Patent No.: US 10,098,067 B2
(45) Date of Patent: Oct. 9, 2018

(54) SERVICE DISCOVERY VIA LOW-POWER WAKE-UP RADIO

(71) Applicant: Intel IP Corporation, Santa Clara, CA (US)

(72) Inventors: Emily H. Qi, Portland, OR (US); Minyoung Park, Portland, OR (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 113 days.

(21) Appl. No.: 15/272,028

(22) Filed: Sep. 21, 2016

(65) Prior Publication Data

US 2018/0084499 A1    Mar. 22, 2018

(51) Int. Cl.
*H04W 52/02*    (2009.01)
*H04W 76/14*    (2018.01)
*H04W 8/00*    (2009.01)
*H04W 84/12*    (2009.01)

(52) U.S. Cl.
CPC ....... *H04W 52/0235* (2013.01); *H04W 8/005* (2013.01); *H04W 76/14* (2018.02); *H04W 84/12* (2013.01)

(58) Field of Classification Search
CPC ........... H04W 52/0235; H04W 76/023; H04W 8/005
See application file for complete search history.

(56) References Cited

U.S. PATENT DOCUMENTS

| | | | | |
|---|---|---|---|---|
| 5,790,946 | A * | 8/1998 | Rotzoll | H04W 52/0229 455/343.1 |
| 9,749,958 | B1 * | 8/2017 | Segev | H04W 52/0235 |
| 2010/0142426 | A1 * | 6/2010 | Taniuchi | H04W 52/028 370/311 |
| 2014/0126442 | A1 * | 5/2014 | Jafarian | H04W 52/0212 370/311 |
| 2015/0208349 | A1 * | 7/2015 | Ramamurthy | H04W 52/0212 370/311 |

(Continued)

OTHER PUBLICATIONS

"International Application Serial No. PCT/US2017/047817, International Search Report dated Nov. 24, 2017", 3 pgs.

(Continued)

*Primary Examiner* — Gary Mui
(74) *Attorney, Agent, or Firm* — Schwegman Lundberg & Woessner, P.A.

(57) ABSTRACT

Embodiments of service discovery via LP-WUR (low-power wake-up radio) are generally described herein, A wireless device receives, at a LP-WUR of the wireless device, a wake-up packet from a peer device. The wireless device decodes the wake-up packet to determine a service ID (identifier) and protocol support information. The wireless device determines that the wireless device is operable to provide a service identified by the service ID and implement a protocol identified by the protocol support information, the protocol comprising NAN (neighbor aware networking) or Wi-Fi direct. The wireless device wakes up a WLAN (wireless local area network) radio of the wireless device in response to determining that the wireless device is capable of providing the service and implementing the protocol.

20 Claims, 9 Drawing Sheets

(56) References Cited

U.S. PATENT DOCUMENTS

| | | | |
|---|---|---|---|
| 2015/0296416 A1* | 10/2015 | Lee | H04W 8/005 370/331 |
| 2015/0304950 A1* | 10/2015 | Li | H04W 52/0216 370/311 |
| 2015/0341849 A1* | 11/2015 | Lee | H04W 48/16 455/41.2 |
| 2015/0350866 A1 | 12/2015 | Patil et al. | |
| 2016/0050551 A1* | 2/2016 | Qi | H04W 8/005 455/434 |
| 2016/0066274 A1* | 3/2016 | Pujari | H04W 52/0235 370/311 |
| 2016/0127996 A1* | 5/2016 | Patil | H04W 48/16 370/311 |
| 2016/0128128 A1* | 5/2016 | Ang | H04W 76/048 370/311 |
| 2016/0270137 A1 | 9/2016 | Yong et al. | |
| 2016/0278013 A1* | 9/2016 | Shellhammer | H04W 52/0225 |
| 2016/0374022 A1* | 12/2016 | Ang | H04L 5/0007 |
| 2017/0223610 A1* | 8/2017 | Qi | H04W 48/08 |
| 2017/0332327 A1* | 11/2017 | Fang | H04W 52/0229 |

OTHER PUBLICATIONS

"International Application Serial No. PCT/US2017/047817, Written Opinion dated Nov. 24, 2017", 9 pgs.

Frank, Hsu, "LP WUR Wake-up Packet Identity Considerations", IEEE 802.11-16/0402r0, [Online] Retrieved from the internet:https//mentor ieee org/802 11/documentsis_dcnLP%2OViUR%2Owakeup%20packet, (Mar. 13, 2016).

Park, Minyoung, "Coexistence Mechanism for Wakeup Radio Signal", doe IEEE 802.11-16/1114rO, (Aug. 26, 2016).

Seok, Yongho, "LP-WUR (Low-Power Wake-Up Receiver) Follow-Up", doc. : IEEE 802.1116/0341r0, (Mar. 14, 2016).

\* cited by examiner

SERVICE DISCOVERY VIA LOW-POWER WAKE-UP RADIO

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group. Some embodiments relate to a low-power wake-up radio (LP-WUR). Some embodiments relate to service discovery via LP-WUR.

BACKGROUND

In recent years, applications have been developed relating to social networking, Internet of Things (IoT), wireless docking, and the like. It may be desirable to design low power solutions that can be always-on. However, constantly providing power to a wireless local area network (WLAN) radio may be expensive in terms of battery life.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
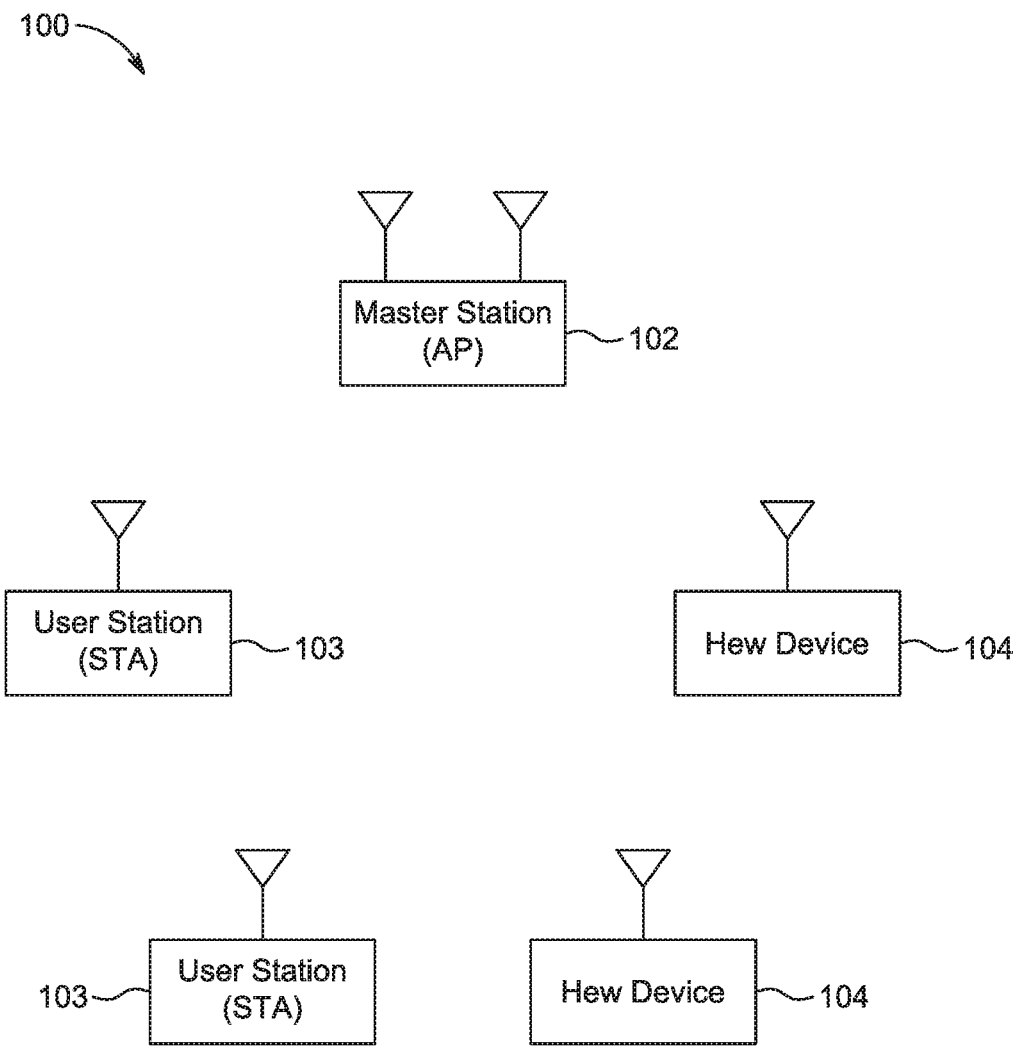
FIG. 1 illustrates a wireless network, in accordance with some embodiments.

FIG. 1 illustrates a wireless network in accordance with some embodiments. In some embodiments, the network 100 may be a High Efficiency Wireless (HEW) Local Area Network (LAN) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HEW devices 104. In some embodiments, the AP 102 may transmit a trigger frame (TF) to an STA 103 to indicate that the STA 103 is to perform an uplink data transmission to the AP. In some embodiments, the AP 102 may transmit downlink data packets to the STA 103, and the STA 103 may transmit a block acknowledgement (BA) message for the downlink data packets. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HEW device 104 and/or other device may be configurable to operate as a master station. Accordingly, in such embodiments, operations that may be performed by the AP 102 as described herein may be performed by the STA 103, HEW device 104 and/or other device that is configurable to operate as the master station.

In some embodiments, one or more of the STAs 103 may be legacy stations. These embodiments are not limiting, however, as the STAs 103 may be configured to operate as HEW devices 104 or may support HEW operation in some embodiments. The master station 102 may be arranged to communicate with the STAs 103 and/or the HEW stations 104 in accordance with one or more of the IEEE 802.11 standards, including 802.11ax and/or others. In accordance with some HEW embodiments, an access point (AP) may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In sonic embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HEW communication may be configured for transmitting a number of spatial streams.

In some embodiments, high-efficiency wireless (HEW) techniques may be used, although the scope of embodiments is not limited in this respect. As an example, techniques included in 802.11ax standards and/or other standards may be used. In accordance with some embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
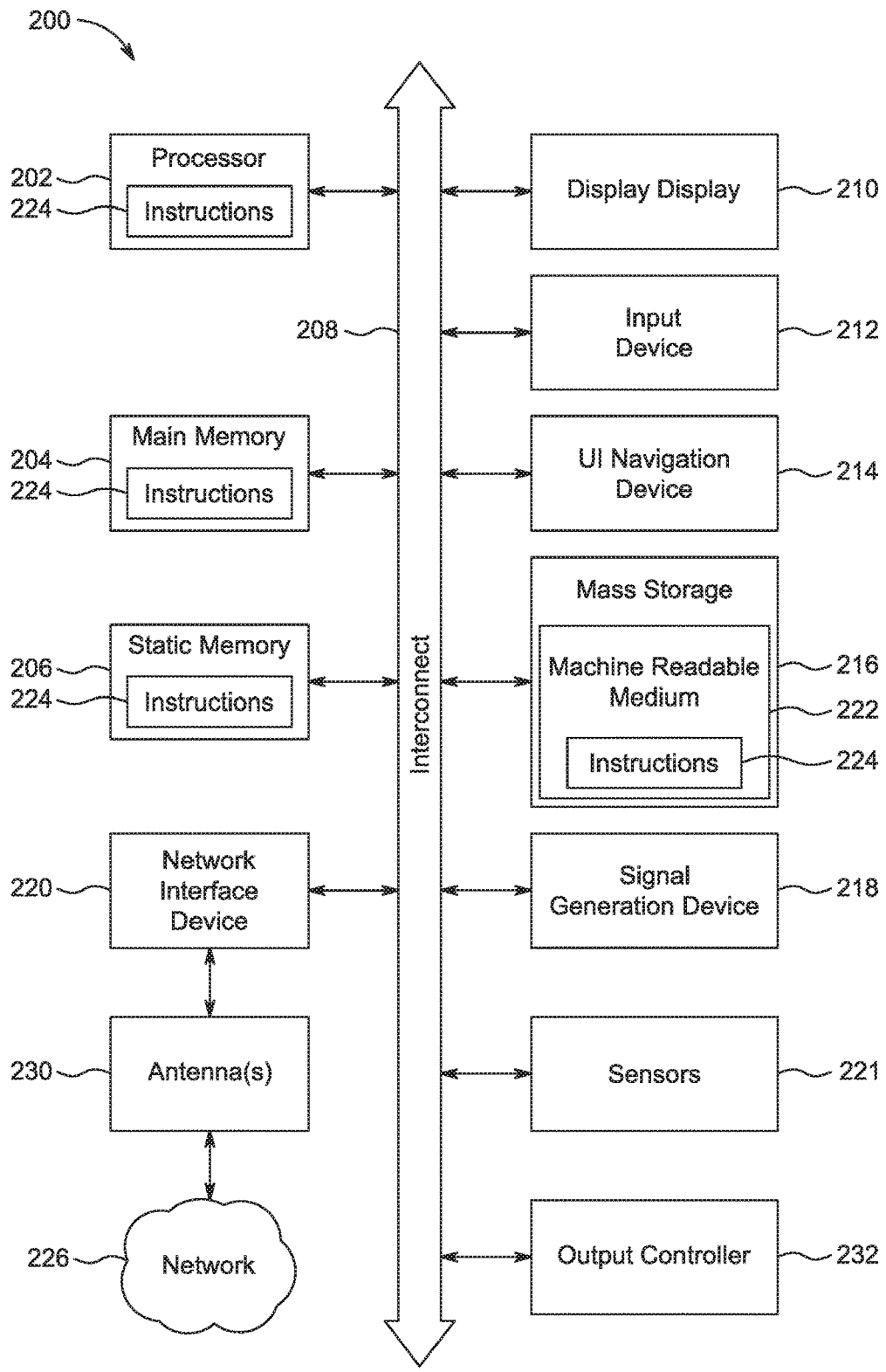
FIG. 2 illustrates an example machine, in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HEW device, HEW AP, HEW STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations, in an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
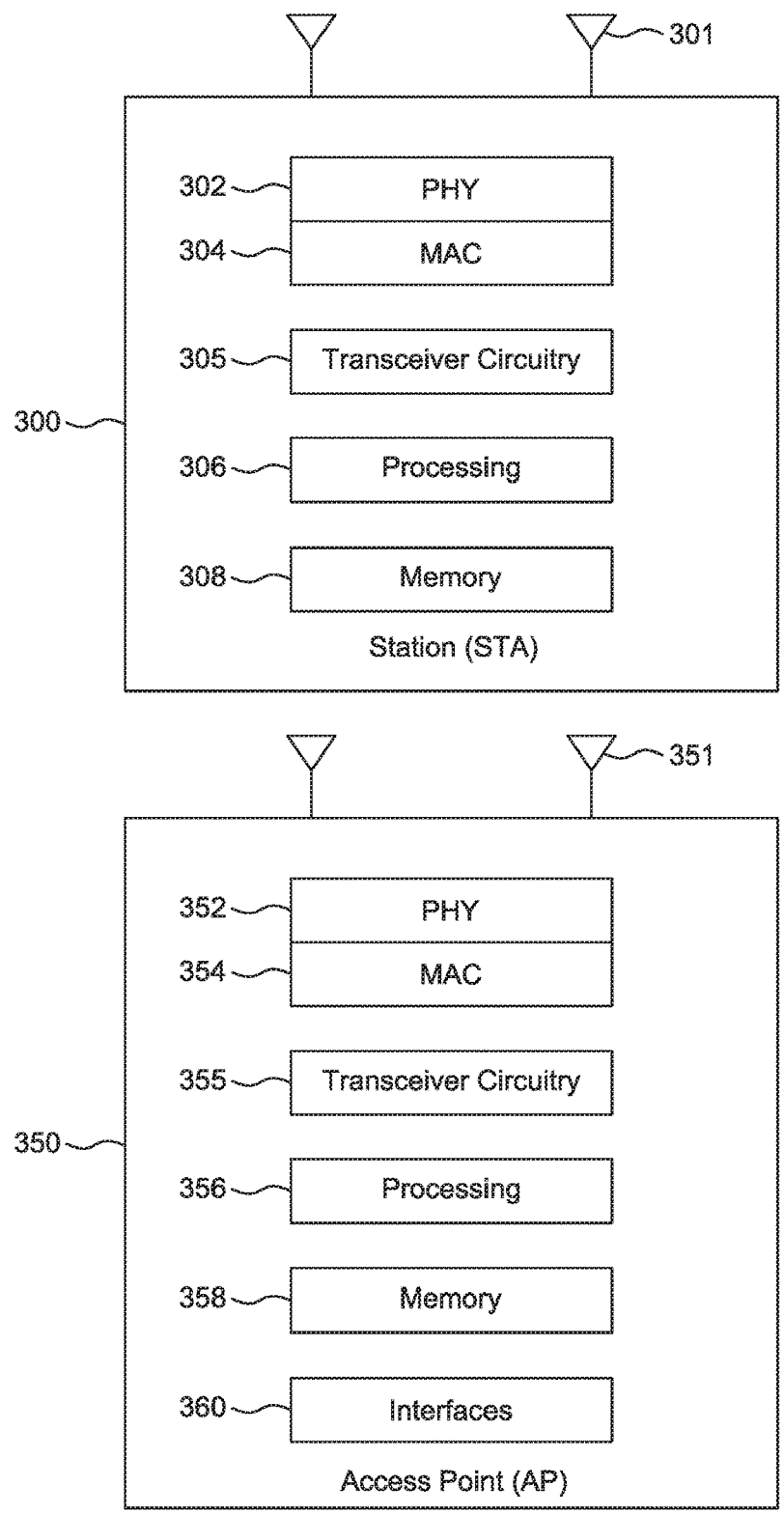
FIG. 3 illustrates a station (STA) in accordance with some embodiments and an access point (AP), in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HEW device 104 (FIG, 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HEW device 104 may be configured to communicate using OFDM communication signals over a multicarrier communication channel. Accordingly, in some cases, the STA 300, AP 350 and/or HEW device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the AP 350, HEW device 104 and/or the STA 300 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In recent years, applications have been developed relating to social networking, Internet of Things (IoT), wireless docking, and the like. It may be desirable to design low power solutions that can be always-on. Multiple efforts are ongoing in the wireless industry to address this challenge. In some aspects, the subject technology uses the Wi-Fi alliance (WFA) neighbor aware networking (NAN) program to define a mechanism for Wi-Fi devices to maintain low power and achieve service discovery. In Bluetooth® Special Interest Group (SIG), Bluetooth® Low Energy provides a power-efficient protocol for some use cases. In the Institute of Electrical and Electronics Engineers (IEEE), low-power wake-up radio (LP-WUR) has gained a lot of interest. The idea of the LP-WUR is to utilize an extremely low power radio such that a device can be in listening mode with minimum capability and consume extremely low power. If the main radio is required for data transmission, a wake-up packet may be sent out by a peer device to wake up the main wireless local area network (WLAN) radio (e.g., Wi-Fi radio).

Figure 4:
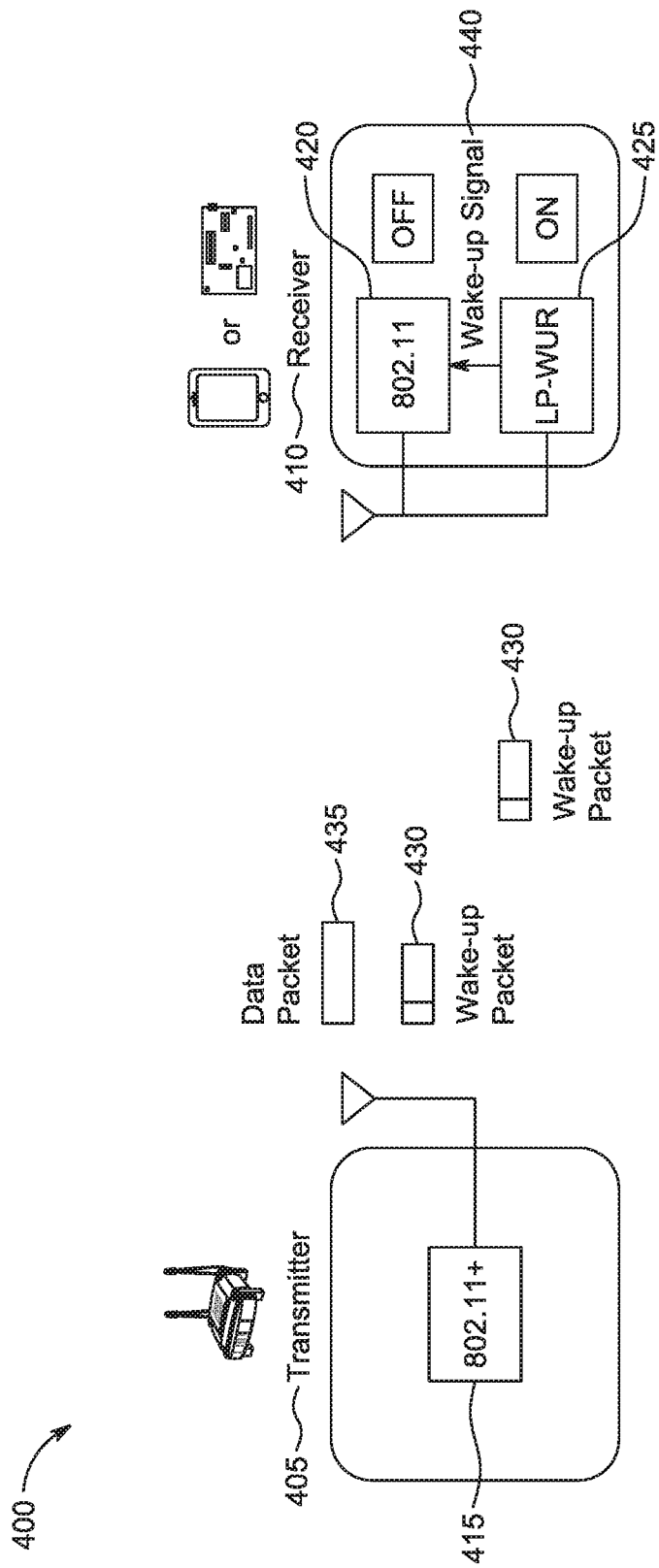
FIG. 4 illustrates an example system in which a low-power wake-up radio is operated, in accordance with some embodiments.

FIG. 4 illustrates an example system 400 in which a low-power wake-up radio is operated. As shown, the system 400 includes a transmitter 405 and a receiver 410. The transmitter 405 may be a WLAN station (e.g., Wi-Fi router) and the receiver 410 may be a computing device capable of connecting to the WLAN station, such as a mobile phone, a tablet computer, a laptop computer, a desktop computer, and the like. The transmitter 405 includes an WLAN (802.11+) radio 415. The receiver 410 includes a WLAN (802.11) radio 420 (e.g., Wi-Fi radio) and a LP-WUR 425. The WLAN radio 415 of the transmitter 405 transmits one or more wake-up packets 430. One of the wake-up packets 430 is received at the LP-WUR 425 of the receiver 420. Upon receiving the wake-up packet 430, the LP-WUR 425 sends a wake-up signal 440, which causes the WLAN radio 420 of the receiver 410 to turn on. The WLAN radio 415 of the transmitter 405 transmits data packet(s) 435 to the WLAN radio 420 of the receiver 410, and the WLAN radio 420 of the receiver 410 receives the data packet(s) 435.

In some aspects, the subject technology is directed to a method to use the LP-WUR wake-up packet 430 to advertise/seek service information. When the desired service is found, the LP-WUR 425 sends a wake-up signal 440 to the WLAN radio 420 of the receiver 410. The receiver 410 then starts further service discovery and establishes connectivity using the WLAN radio 420.

Aspects of the subject technology are directed to a device 405 (e.g., Wi-Fi device) that advertises or seeks service sending a wake-up packet 430. The wake-up packet 430 may be a one-time packet or a periodic packet. For a Wi-Fi aware device, the wake-up packet 430 may be transmitted in the discovery window (DW) periodically.

In some cases, the wake-up packet 430 includes advertised or sought service identifiers and indicates supported discovery mechanisms. For example, the Wi-Fi discovery mechanism may be Wi-Fi direct discovery, NAN discovery, Wi-Fi infrastructure discovery, and the like.

A device 410 with LP-WUR 425 checks whether the service identifiers match or not. If matched, the LP-WUR 425 wakes up the WLAN radio 420 with a wake-up signal 440. If the device 410 with the LP-WUR 425 is a seeker or a subscriber, the device 410 starts further service discovery or sets up further connectivity using the WLAN radio 420. If the device 410 with the LP-WUR 425 is an advertiser or a publisher, the device 410 starts advertising service information using the WLAN radio 420.

Figure 5:
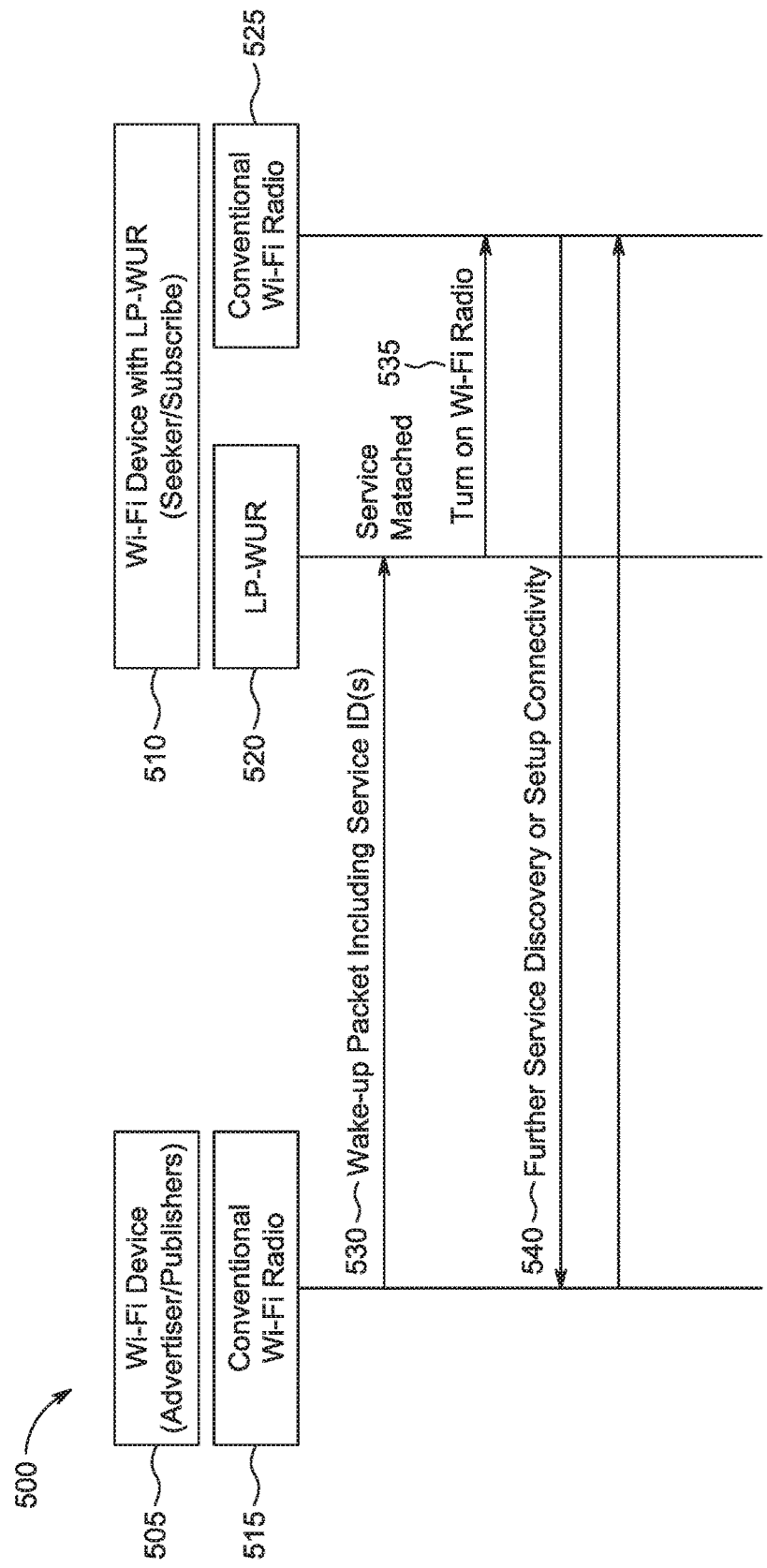
FIG. 5 is a data flow diagram illustrating an example method of using a low-power wake-up radio to wake-up a Wi-Fi radio of a seeker/subscriber device, in accordance with some embodiments.

FIG. 5 is a data flow diagram illustrating an example method 500 of using a low-power wake-up radio to wake-up a Wi-Fi radio of a seeker/subscriber device. In the method 500, a Wi-Fi advertiser/publisher device 505, which has a Wi-Fi radio 515, interacts with a Wi-Fi seeker/subscriber device 510, which has a LP-WUR 520 and a radio 525.

At operation 530, the Wi-Fi radio 515 of the Wi-Fi advertiser/publisher device 505 sends a wake-up packet including service identifier(s) (ID(s)) to the LP-WUR 520. The LP-WUR 520 determines that the Wi-Fi seeker/subscriber device 510 is capable of providing service(s) corresponding to the service ID(s).

At operation 535, the LP-WUR 520 causes the Wi-Fi seeker/subscriber device 510 to turn on the Wi-Fi radio 525 in response to determining that the Wi-Fi seeker/subscriber device 510 is capable of providing the service(s) corresponding to the service ID(s).

At operation 540, the Wi-Fi seeker/subscriber device 510, using its Wi-Fi radio 525, engages in further service discovery or sets up connectivity with the Wi-Fi radio 515 of the Wi-Fi advertiser/publisher device 505.

Figure 6:
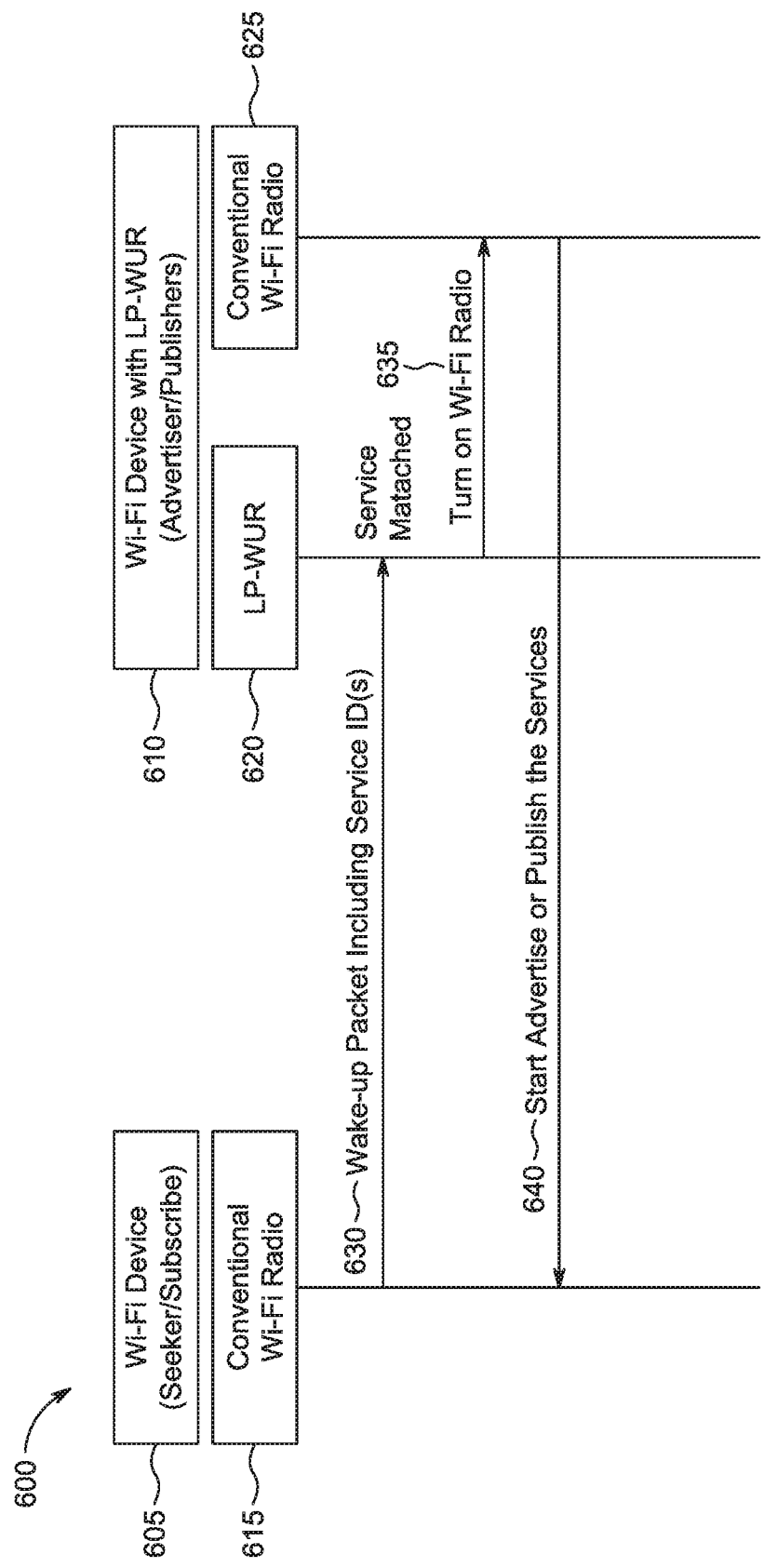
FIG. 6 is a data flow diagram illustrating an example method of using a low-power wake-up radio to wake-up a Wi-Fi radio of an advertiser/publisher device, in accordance with some embodiments.

FIG. 6 is a data flow diagram illustrating an example method 600 of using a low-power wake-up radio to wake-up a Wi-Fi radio of an advertiser/publisher device. In the method 600, a Wi-Fi seeker/subscriber device 605 having a Wi-Fi radio 615 interacts with a Wi-Fi advertiser/publisher device 610 having a LP-WUR 620 and a Wi-Fi radio 625.

At operation 630, the Wi-Fi radio 615 of the Wi-Fi seeker/subscriber device 605 sends a wake-up packet including service ID(s) to the LP-WUR 620. The LP-WUR 620 determines that the Wi-Fi advertiser/publisher device 610 is capable of providing service(s) corresponding to the service ID(s).

At operation 635, the LP-WUR 620 causes the Wi-Fi advertiser/publisher device 610 to turn on the Wi-Fi radio 625 in response to determining that the Wi-Fi seeker/subscriber device 610 is capable of providing the service(s) corresponding to the service ID(s).

At operation 640, the Wi-Fi advertiser/publisher device 610, using its Wi-Fi radio 625, starts to advertise or to publish the service(s) to the Wi-Fi radio 615 of the Wi-Fi seeker/subscriber device 605.

According to some embodiments, the subject technology combines the concept of low-power radio and service discovery so that a device can maximize the time of staying in low-power radio mode without periodic wake up to save power. Some of the proposed solutions provide a low cost (e.g., in terms of power consumption) method for the device, since the device does not need to implement another high-power radio (e.g., a Bluetooth® radio) aside from the main WLAN radio of the device. According to some implementations, the wake-up packet 430 includes the information set forth in Table 1.

TABLE 1

Information stored in wake-up packet.

| Field | Size (bits) | Description |
|---|---|---|
| Band Support | 1 | 0: Indicates 2.4 GHz/5 GHz<br>1: Indicates support for 60 GHz only |
| Protocol Support (e.g., Wi-Fi P2P protocol) | 4 | Example:<br>Bit 0: set to 1 indicates supporting Wi-Fi direct; otherwise, not.<br>Bit 1: set to 1 indicates supporting NAN; otherwise, not.<br>Bit 2: set to 1 indicates supporting Wi-Fi infrastructure; otherwise, not.<br>Bit 3: reserved. |
| Service ID Information | Variable | The service ID information can be:<br>A hash value of the service names;<br>A hash value of service has that is used in existing standards, such as ASP2 or NAN; or A bloom fitter that includes multiple service hash. |

A device with LP-WUR checks the service ID information, the band support, and the peer-to-peer (P2P) protocol support. If service is matched, and the protocol and band are supported, the LP-WUR wakes up the WLAN radio of the device and enables the corresponding protocol that the peer device supports.

If the device with LP-WUR is a seeker or subscriber, the device starts further service discovery or sets up connectivity using the WLAN radio, as described in conjunction with FIG. 5. If the Wi-Fi direct protocol is used, the Wi-Fi device with the LP-WUR sends the probe request frame to the peer device to start Wi-Fi direct discovery and then set up P2P connectivity. If the NAN protocol is used, the Wi-Fi device with LP-WUR sends the NAN service discovery frame (subscribe) to the peer device to start NAN discovery and then setup NAN data connectivity.

If the device with LP-WUR is an advertiser or publisher, the device can start advertising service information using its WLAN radio, as described in conjunction with FIG. 6. If the Wi-Fi direct protocol is used, the Wi-Fi device with LP-WUR sends the probe response frame to the peer device to start Wi-Fi direct discovery and then setup P2P connectivity. If the NAN protocol is used, the Wi-Fi device with LP-WUR sends a NAN service discovery frame (publish) to the peer device to start NAN discovery and then setup NAN data connectivity.

As illustrated and discussed in conjunction with FIG. 4, the LP-WUR 425 may be used in techniques to minimize power consumption without increasing latency. The idea of the LP-WUR 425 is to use a simple receiver that consumes extremely low power e.g., ~100 uW) so that a the device 410 can be in listening mode with minimum receiver capability and consume extremely low power. If the transmitter device 405 has data to transmit to the receiver device 410, which is equipped with the LP-WUR 425, the transmitter device 405 transmits a wake-up packet 430 that can be received by the LP-WUR prior to transmission of the data packet(s) 435. Upon reception of the wake-up packet 430 at the receiver device 410, the LP-WUR 425 of the receiver device wakes up the WLAN radio 420, which receives the data packet(s) 435. In this way, the receiver device 410 can stay in a low-power mode and, at the same time, receive data at the PHY (physical) rate of the WLAN radio 420.

In some cases, a mechanism for a Wi-Fi device implementing NAN to provide a service discovery function that consumes low power is desirable. In order to enable the low power service discovery function, multiple NAN devices synchronize with each other so that they synchronize an active time period and a sleep time period and transmit and receive service discovery frames during the active time period. Although the synchronization of the NAN device as helps lower the power consumption of the service discovery, maintaining the synchronization between the NAN devices is not a trivial task. In some cases, in order to maintain the synchronization among the NAN devices, all the NAN devices need to participate in maintaining the synchronization of the group by transmitting and receiving synchronization beacons. This consumes power and time/frequency resources. Some aspects of the subject technology are directed to techniques for using LP-WUR to enable a low-power service discovery function that enables NAN devices to do discovery without synchronization.

In some aspects, the subject technology includes replacing the time synchronization function of the NAN operation with the wake-up packet transmission and LP-WUR to enable more efficient low-power service discovery.

The idea is to have a device that is searching for a service to transmit a wake-up packet that includes time information indicating when to exchange service discovery frames. The devices that receive the wake-up packet with time information may synchronize together to indicate a common time for discovery so that a device in low-power listening mode does not need to wake up multiple times for discovery.

All other NAN devices that are not searching for a service are in a low-power listening mode that uses the LP-WUR waiting for a wake-up packet. Furthermore, all the other NAN devices that are not searching for the service do not need to synchronize and waste power.

When a NAN device receives a wake-up packet that includes a service identifier that the NAN device can provide or the NAN device has been looking for, the NAN device wakes up its WLAN radio at the time set forth in the wake-up packet and exchanges service discovery frames.

According to one NAN service discovery scheme, NAN devices participate in the synchronization process, which consumes power and time/frequency resources. Even if a device is not looking for a service, it may participate in the synchronization process by transmitting and receiving synchronization beacons.

In contrast, according to some aspects, the subject technology does not maintain the synchronization for devices that are not looking for a service and, therefore, are not wasting power and resources for synchronization. These devices can stay in the low-power listen mode that uses LP-WUR to wait for a wake-up packet.

When a device attempts to find a service to use, the device transmits a wake-up packet with the time information and a service identifier corresponding to the service it is attempting to find. The device then exchanges, with other devices, service discovery frames at the time indicated in the wake-up frame. The device may also participate in synchronization, so that the time indicated in the wake-up frame is the synchronized time for discovery. In this manner, service discovery becomes more efficient and service discovery latency is minimized.

Figure 7:
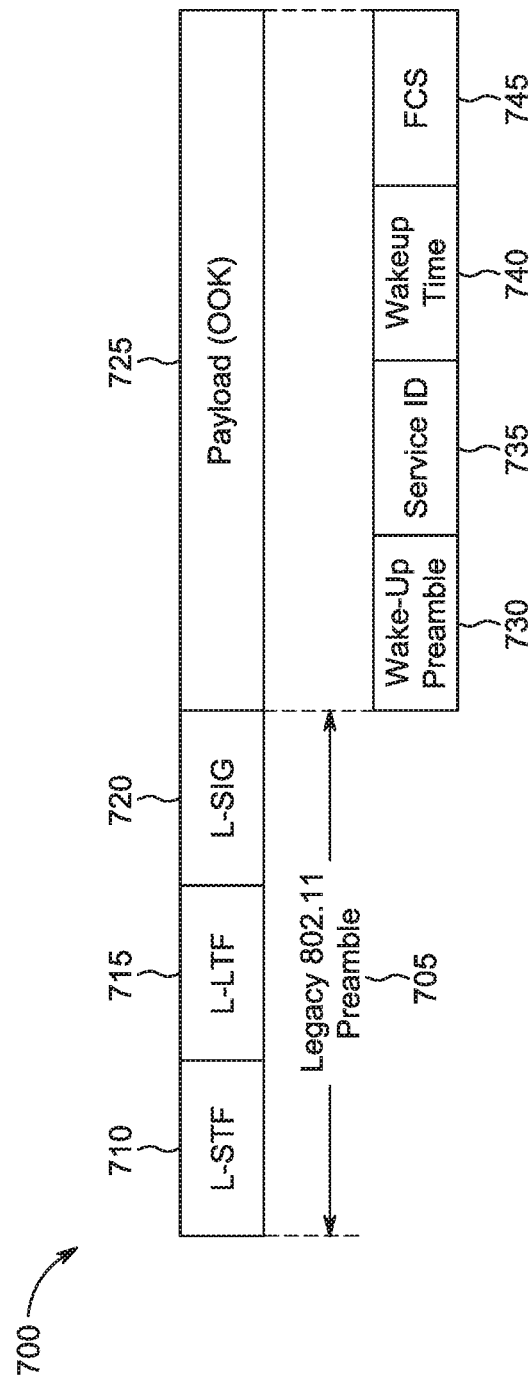
FIG. 7 illustrates an example service discovery wake-up packet, in accordance with some embodiments.

FIG. 7 illustrates an example service discovery wake-up packet 700. The packet 700 may correspond to the wake-up packet 430. As shown, the wake-up packet 700 includes a legacy 802.11 preamble 705 and a payload 725. The legacy 802.11 preamble 705 includes L-STF (legacy short training field) 710, L-LTF (legacy long training field) 715, and L-SIG (legacy signal field) 720). The payload 725 includes a wake-up preamble 730, a service ID 735, a wakeup time 740, and a FCS (frame check sequence) 745.

The service ID field 735 indicates the identifier (ID) of the service that the wake-up packet 700 is seeking or can provide. The wakeup time field 740 indicates the time at which the wakeup packet transmitter and wakeup packet receiver(s) wake up and exchange service discovery frames.

The time value includes in the wakeup time field 740 may indicate the time duration after the reception of the wake-up packet 700. If the device is synchronized to a NAN cluster, the time value included in the wakeup time field 740 may indicate the time duration between the reception of the wakeup packet 700 and the start time of any synchronized discovery window of the NAN cluster. The time value indicated in the wakeup time field 740 may be limited by a maximum value based on the requirement of the clock drift between the device transmitting the wake-up packet and the device receiving the wake-up packet 700.

Figure 8:
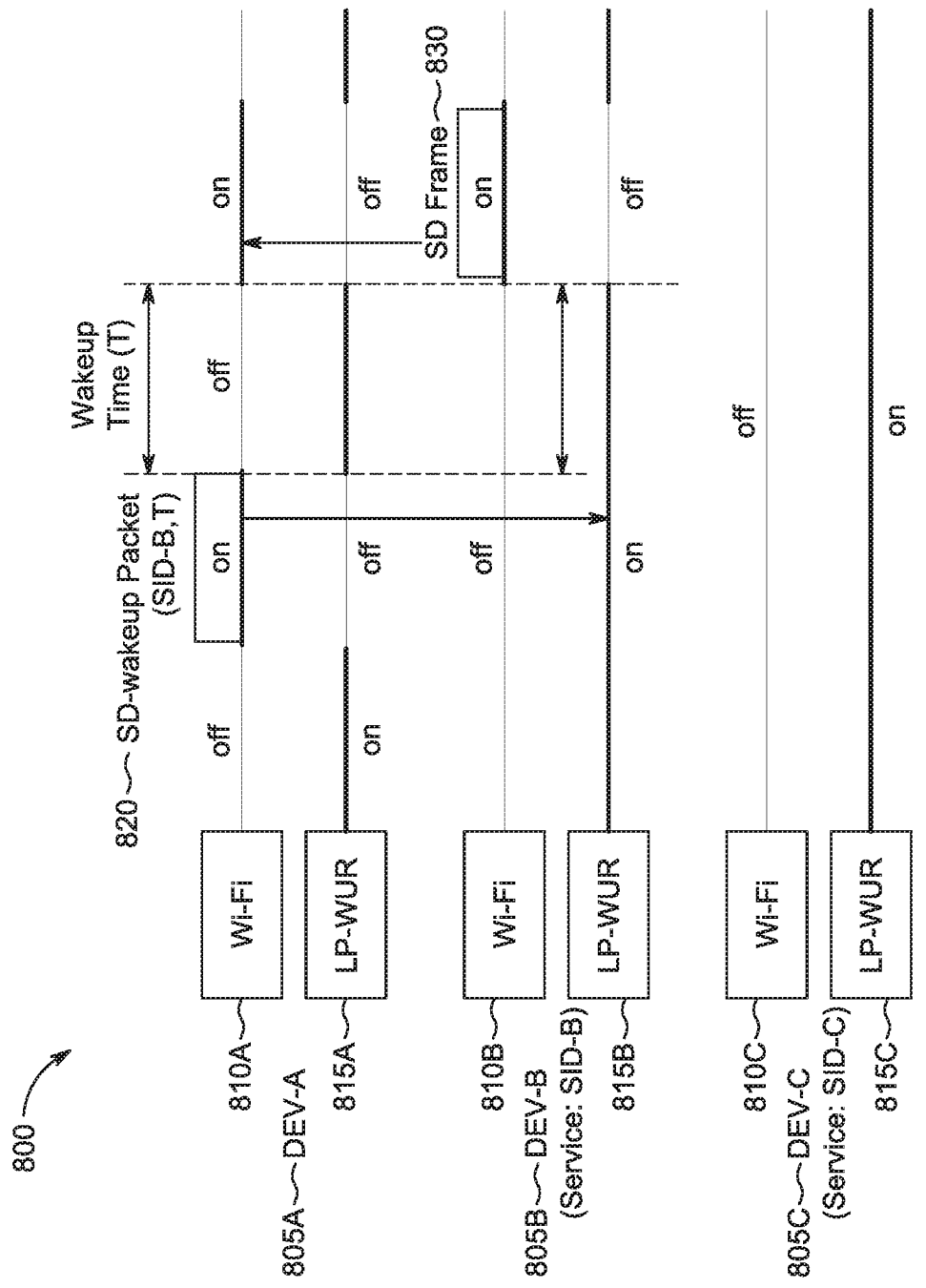
FIG. 8 is a time diagram of an example of low-power wake-up radio based service discovery, in accordance with some embodiments.

FIG. 8 is a time diagram of an example of low-power wake-up radio based service discovery 800. The service discovery 800 includes devices (DEVs) DEV-A 805A, DEV-B 805B, and DEV-C 805C. DEV-B 805B provides a service identified by service identifier (SID) SID-B. DEV-C 805C provides a service identified by SID-C. DEV-A 805A has a Wi-Fi radio 810A and a LP-WUR 815A, DEV-B 805B has a Wi-Fi radio 810B and a LP-WUR 815B. DEV-C 805C has a Wi-Fi radio 810C and a LP-WUR 815C.

As shown, DEV-C 805C does not have any service to seek or advertise for all of the time shown in the time diagram. Accordingly, the LP-WUR 815C is turned on, and the Wi-Fi radio 810C is turned off When DEV-A 805A has a service to seek or advertise, DEV-A 805A creates a SD (service discovery) wakeup packet 820. The SD wakeup packet 820 includes the service identifier of the service (SID-B) DEV-A 805A is seeking or advertising in its service ID field 735. The SD wakeup packet 820 includes the time (T) at which DEV-A 805A will start exchanging service discovery frames in the wakeup time field 740 of the SD wakeup packet 820. DEV-A 805A transmits the SD wakeup packet 820 via its Wi-Fi radio 810A by following Wi-Fi/802.11 channel access rules. DEV-A 805A may transmit the SD wakeup packet 820 once, multiple times, or periodically.

When DEV-B 805B receives the SD wakeup packet 820 via its LP-WUR 815B, DEV-B verifies that it can provide the service identified in the service ID field 735 (SID-B). In response to this verification, DEV-B 805B wakes up its Wi-Fi radio 810B at the time indicated in the wake-up time field 740 of the received SD wakeup packet 820. At the time indicated in the wake-up time field 740, DEV-A 805A and DEV-B 805B start to exchange service discovery frames. DEV-C 805C stays in the low-power listening mode (with LP-WUR 815C turned on and Wi-Fi radio 810C turned off) since the service identifier (SID-B) included in the SD wakeup packet 820 does not match the service (SID-C) provided by DEV-C 805C.

Figure 9:
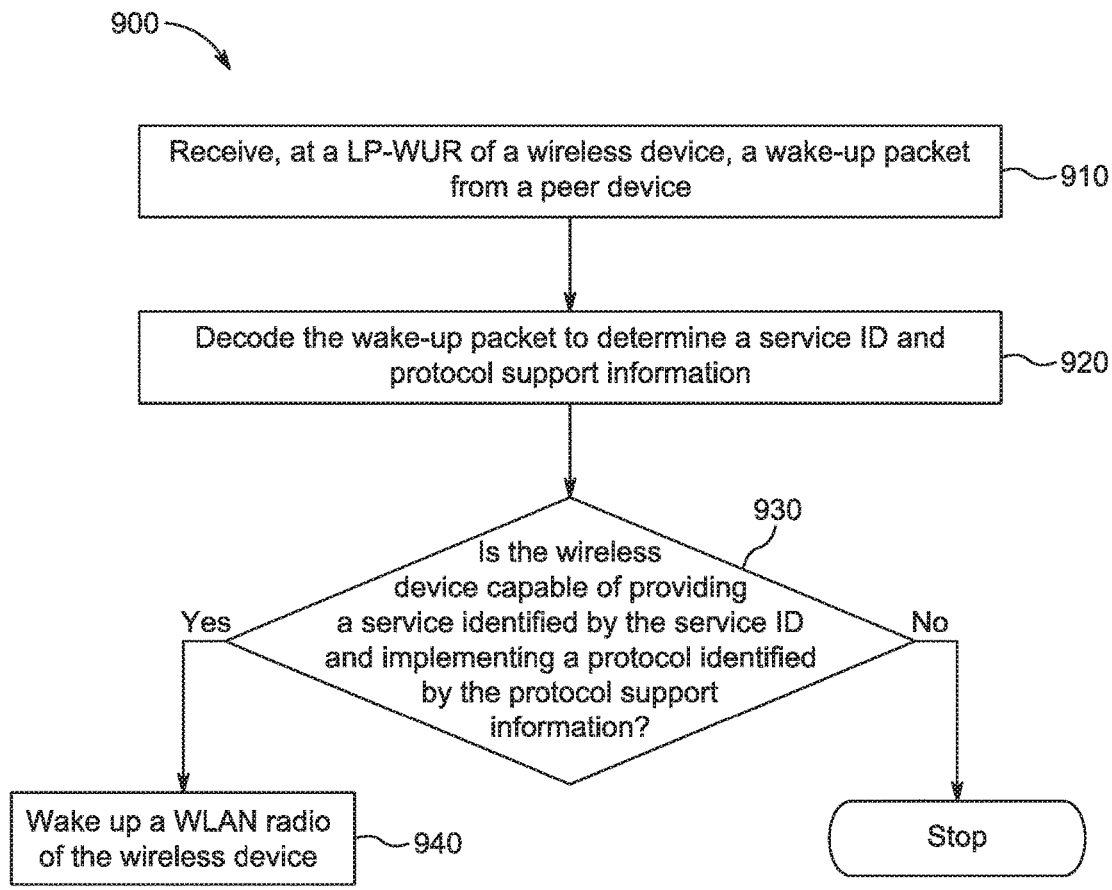
FIG. 9 is a flow chart of an example method for waking up a wireless local area network radio of a wireless device, in accordance with some embodiments.

FIG. 9 is a flow chart of an example method 900 for waking up a wireless local area network radio of a wireless device 410.

At operation 910, the wireless device 410 receives, at a LP-WUR 425 of the wireless device, a wake-up packet 430 from a peer device 405.

At operation 920, the wireless device 410 decodes the wake-up packet to determine a service ID and protocol support information.

At operation 930, the wireless device 410 determines whether the wireless device 410 is capable of providing a service identified by the service ID and implementing a protocol identified by the protocol support information. If not, the method 900 stops. If so, the method 900 continues to operation 940.

At operation 940, in response to determining that the wireless device 410 is capable of providing a service identified by the service ID and implementing a protocol identified by the protocol support information, the wireless device 410 wakes up a WLAN radio 420 of the wireless device 410.

Aspects of the subject technology are described below using various examples.

1. An apparatus of a wireless device configured for peer-to-peer (P2P) communication, the apparatus comprising:
   memory; and processing circuitry, the processing circuitry to:
   receive, at a LP-WUR (low-power wake-up radio) of the wireless device, a wake-up packet from a peer device;
   decode the wake-up packet to determine a service ID (identifier) and protocol support information;
   determine that the wireless device is operable to provide a service identified by the service ID and implement a protocol identified by the protocol support information, the protocol comprising NAN (neighbor aware networking) or Wi-Fi direct;
   wake up a WLAN (wireless local area network) radio of the wireless device in response to determining that the wireless device is capable of providing the service and implementing the protocol;
   if the wireless device is operating as a seeker or a subscriber device: initiate further service discovery or setup connectivity using the WLAN radio; and
   if the wireless device is operating as an advertiser or a publisher device: initiate advertising service information using the WLAN radio.

2. The apparatus of Example 1, wherein the service ID comprises one or more of a hash value of a service name, a hash value of a standard name, the standard comprising ASP2 or NAN, or a Bloom filter that includes a multiple service hash.

3. The apparatus of Example 1, wherein the protocol comprises Wi-Fi direct, and wherein the processing circuitry is further to:
   encode for transmission of a probe response frame in response to the wake-up packet.

4. The apparatus of Example 1, wherein the protocol comprises NAN, and wherein the processing circuitry is further to:
   encode for transmission of a NAN SD (service discovery) frame to start NAN discovery and set up NAN connectivity in response to the wake-up packet.

5. The apparatus of Example 1, wherein the wake-up packet includes band support information, the band support information indicating support for 2.4/5 GHz or 60 GHz.

6. The apparatus of Example 5, wherein the band support information occupies one bit and the protocol support information occupies four bits.

7. The apparatus of Example 5, wherein waking up the WLAN radio is in response to determining that the wireless device is capable of supporting a band identified by the band support information.

8. The apparatus of Example 1, wherein the wake-up packet indicates a wake-up time, and wherein waking up the WLAN radio of the wireless device occurs at the indicated wake-up time.

9. The apparatus of Example 1, wherein the processing circuitry is further to:
   turn off the LP-WUR upon waking up the WLAN radio of the computing device.

10. The apparatus of Example 1, further comprising:
    the LP-WUR; and
    the WLAN radio.

11. A non-transitory machine-readable medium storing instructions for execution by processing circuitry of a wireless device configured for peer-to-peer (P2P) communication, the instructions causing the processing circuitry to:
    receive, at a LP-WUR (low-power wake-up radio) of the wireless device, a wake-up packet from a peer device;
    decode the wake-up packet to determine a service ID (identifier) and protocol support information;
    determine that the wireless device is operable to provide a service identified by the service ID and implement a protocol identified by the protocol support information, the protocol comprising NAN (neighbor aware networking) or Wi-Fi direct;
    wake up a WLAN (wireless local area network) radio of the wireless device in response to determining that the wireless device is capable of providing the service and implementing the protocol, the WLAN radio meeting an IEEE (Institute of Electrical and Electronics Engineers) 802.11 standard;

if the wireless device is operating as a seeker or a subscriber device: initiate further service discovery or setup connectivity using the WLAN radio; and if the wireless device is operating as an advertiser or a publisher device: initiate advertising service information using the WLAN radio.

12. The machine-readable medium of Example 11, wherein the service ID comprises one or more of a hash value of a service name, a hash value of a standard name, the standard comprising ASP2 or NAN, or a Bloom filter that includes a multiple service hash.

13. The machine-readable medium of Example 11, wherein the protocol comprises Wi-Fi direct, and wherein the processing circuitry is further to:
encode for transmission of a probe response frame in response to the wake-up packet.

14. The machine-readable medium of Example 11, wherein the protocol comprises NAN, and wherein the processing circuitry is further to:
encode for transmission of a NAN SD (service discovery) frame to start NAN discovery and set up NAN connectivity in response to the wake-up packet.

15. The machine-readable medium of Example 11, wherein the wake-up packet includes band support information, the band support information indicating support for 2.4/5 GHz or 60 GHz.

16. The machine-readable medium of Example 15, wherein the band support information occupies one bit and the protocol support information occupies four bits.

17. The machine-readable medium of Example 15, wherein waking up the WLAN radio is in response to determining that the wireless device is capable of supporting a band identified by the band support information.

18. A method, implemented at a wireless device configured for peer-to-peer (P2P) communication, the method comprising:
receiving, at a LP-WUR (low-power wake-up radio) of the wireless device, a wake-up packet from a peer device;
decoding the wake-up packet to determine a service ID (identifier) and protocol support information;
determining that the wireless device is operable to provide a service identified by the service ID and implement a protocol identified by the protocol support information, the protocol comprising NAN (neighbor aware networking) or Wi-Fi direct;
waking up a WLAN (wireless local area network) radio of the wireless device in response to determining that the wireless device is capable of providing the service and implementing the protocol, the WLAN radio meeting an IEEE (Institute of Electrical and Electronics Engineers) 802.11 standard;
if the wireless device is operating as a seeker or a subscriber device: initiating further service discovery or setup connectivity using the WLAN radio; and
if the wireless device is operating as an advertiser or a publisher device: initiating advertising service information using the WLAN radio.

19. The method of Example 18, wherein the service ID comprises one or more of a hash value of a service name, a hash value of a standard name, the standard comprising ASP2 or NAN, or a Bloom filter that includes a multiple service hash.

20. An apparatus of a peer device configured for peer-to-peer (P2P) communication, the apparatus comprising:
memory; and processing circuitry, the processing circuitry to:
encode for transmission of a wake-up packet from the peer device to a LP-WUR (low-power wake-up radio) of a wireless device, the wake-up packet comprising a service ID (identifier) and protocol support information, the protocol support information identifying a protocol, the protocol comprising NAN (neighbor aware networking) or Wi-Fi direct; and
decode a frame, received in response to the wake-up packet, the frame indicating that a WLAN (wireless local area network) radio of the wireless device has been activated, and that the wireless device is operable to provide a service identified by the service ID and implement the protocol identified by the protocol support information.

21. The apparatus of Example 20, wherein the protocol comprises Wi-Fi direct, and wherein the frame comprises a probe response frame.

22. The apparatus of Example 20, wherein the protocol comprises NAN, and wherein the frame comprises a NAN SD (service discovery) frame, the NAN SD frame indicating starting of NAN discovery and setting up of NAN connectivity, at the wireless device, in response to the wake-up packet from the peer device.

The Abstract is provided to comply with 37 C.F.R. Section 1.72(b) requiring an abstract that will allow the reader to ascertain the nature and gist of the technical disclosure. it is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device configured for peer-to-peer (P2P) communication, the apparatus comprising:
    memory; and processing circuitry, the processing circuitry to:
    receive, at a LP-WUR (low-power wake-up radio) of the wireless device, a wake-up packet from a peer device, wherein the wake-up packet includes band support information, the band support information indicating support for 2.4/5 GHz or 60 GHz;
    decode the wake-up packet to determine a service ID (identifier) and protocol support information;
    determine that the wireless device is operable to provide a service identified by the service ID and implement a protocol identified by the protocol support information, the protocol comprising NAN (neighbor aware networking) or Wi-Fi direct;
    wake up a WLAN (wireless local area network) radio of the wireless device in response to determining that the wireless device is capable of providing the service and implementing the protocol;
    if the wireless device is operating as a seeker or a subscriber device: initiate further service discovery or setup connectivity using the WLAN radio; and
    if the wireless device is operating as an advertiser or a publisher device: initiate advertising service information using the WLAN radio.

2. The apparatus of claim 1, wherein the service ID comprises one or more of a hash value of a service name, a hash value of a standard name, the standard comprising ASP2 or NAN, or a Bloom filter that includes a multiple service hash.

3. The apparatus of claim 1, wherein the protocol comprises Wi-Fi direct, and wherein the processing circuitry is further to:

encode for transmission of a probe response frame in response to the wake-up packet.

4. The apparatus of claim 1, wherein the protocol comprises NAN, and wherein the processing circuitry is further to:
encode for transmission of a NAN SD (service discovery) frame to start NAN discovery and set up NAN connectivity in response to the wake-up packet.

5. The apparatus of claim 1, wherein the band support information occupies one bit and the protocol support information occupies four bits.

6. The apparatus of claim 1, wherein waking up the WLAN radio is in response to determining that the wireless device is capable of supporting a band identified by the band support information.

7. The apparatus of claim 1, wherein the wake-up packet indicates a wake-up time, and wherein waking up the WLAN radio of the wireless device occurs at the indicated wake-up time.

8. The apparatus of claim 1, wherein the processing circuitry is further to:
turn off the LP-WUR upon waking up the WLAN radio of the computing device.

9. The apparatus of claim 1, further comprising:
the LP-WUR; and
the WLAN radio.

10. A non-transitory machine-readable medium storing instructions for execution by processing circuitry of a wireless device configured for peer-to-peer (P2P) communication, the instructions causing the processing circuitry to:
receive, at a LP-WUR (low-power wake-up radio) of the wireless device, a wake-up packet from a peer device, wherein the wake-up packet includes band support information, the band support information indicating support for 2.4/5 GHz or 60 GHz;
decode the wake-up packet to determine a service ID (identifier) and protocol support information;
determine that the wireless device is operable to provide a service identified by the service ID and implement a protocol identified by the protocol support information, the protocol comprising NAN (neighbor aware networking) or Wi-Fi direct;
wake up a WLAN (wireless local area network) radio of the wireless device in response to determining that the wireless device is capable of providing the service and implementing the protocol, the WLAN radio meeting an IEEE (Institute of Electrical and Electronics Engineers) 802.11 standard;
if the wireless device is operating as a seeker or a subscriber device: initiate further service discovery or setup connectivity using the WLAN radio; and
if the wireless device is operating as an advertiser or a publisher device: initiate advertising service information using the WLAN radio.

11. The machine-readable medium of claim 10, wherein the service ID comprises one or more of a hash value of a service name, a hash value of a standard name, the standard comprising ASP2 or NAN, or a Bloom filter that includes a multiple service hash.

12. The machine-readable medium of claim 10, wherein the protocol comprises Wi-Fi direct, and wherein the processing circuitry is further to:
encode for transmission of a probe response frame in response to the wake-up packet.

13. The machine-readable medium of claim 10, wherein the protocol comprises NAN, and wherein the processing circuitry is further to:
encode for transmission of a NAN SD (service discovery) frame to start NAN discovery and set up NAN connectivity in response to the wake-up packet.

14. The machine-readable medium of claim 10, wherein the band support information occupies one bit and the protocol support information occupies four bits.

15. The machine-readable medium of claim 10, wherein waking up the WLAN radio is in response to determining that the wireless device is capable of supporting a band identified by the band support information.

16. A method, implemented at a wireless device configured for peer-to-peer (P2P) communication, the method comprising:
receiving, at a LP-WUR (low-power wake-up radio) of the wireless device, a wake-up packet from a peer device, wherein the wake-up packet includes band support information, the band support information indicating support for 2.4/5 GHz or 60 GHz;
decoding the wake-up packet to determine a service ID (identifier) and protocol support information;
determining that the wireless device is operable to provide a service identified by the service ID and implement a protocol identified by the protocol support information, the protocol comprising NAN (neighbor aware networking) or Wi-Fi direct;
waking up a WEAN (wireless local area network) radio of the wireless device in response to determining that the wireless device is capable of providing the service and implementing the protocol, the WLAN radio meeting an IEEE (Institute of Electrical and Electronics Engineers) 802.11 standard;
if the wireless device is operating as a seeker or a subscriber device: initiating further service discovery or setup connectivity using the WEAN radio; and
if the wireless device is operating as an advertiser or a publisher device: initiating advertising service information using the WLAN radio.

17. The method of claim 16, wherein the service ID comprises one or more of a hash value of a service name, a hash value of a standard name, the standard comprising ASP2 or NAN, or a Bloom filter that includes a multiple service hash.

18. An apparatus of a peer device configured for peer-to-peer (P2P) communication, the apparatus comprising:
memory; and processing circuitry, the processing circuitry to:
encode for transmission of a wake-up packet from the peer device to a LP-WUR (low-power wake-up radio) of a wireless device, the wake-up packet comprising a service ID (identifier) and protocol support information, the protocol support information identifying a protocol, the protocol comprising NAN (neighbor aware networking) or Wi-Fi direct, wherein the wake-up packet includes band support information, the band support information indicating support for 2.4/5 GHz or 60 GHz; and
decode a frame, received in response to the wake-up packet, the frame indicating that a WLAN (wireless local area network) radio of the wireless device has been activated, and that the wireless device is operable to provide a service identified by the service ID and implement the protocol identified by the protocol support information.

19. The apparatus of claim 18, wherein the protocol comprises Wi-Fi direct, and wherein the frame comprises a probe response frame.

20. The apparatus of claim 18, wherein the protocol comprises NAN, and wherein the frame comprises a NAN SD (service discovery) frame, the NAN SD frame indicating starting of NAN discovery and setting up of NAN connectivity, at the wireless device, in response to the wake-up packet from the peer device.

\* \* \* \* \*

UNITED STATES PATENT AND TRADEMARK OFFICE
CERTIFICATE OF CORRECTION

PATENT NO. : 10,098,067 B2  
APPLICATION NO. : 15/272028  
DATED : October 9, 2018  
INVENTOR(S) : Qi et al.

Page 1 of 1

It is certified that error appears in the above-identified patent and that said Letters Patent is hereby corrected as shown below:

On the Title Page

Item (57), in "Abstract", in Column 2, Line 2, delete "herein," and insert --herein.-- therefor In the Claims In Column 18, Line 27, in Claim 16, delete "WEAN" and insert --WLAN-- therefor In Column 18, Line 35, in Claim 16, delete "WEAN" and insert --WLAN-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*